UNITED STATES PATENT OFFICE.

ROBERT C. STANLEY, OF NEW BRIGHTON, NEW YORK, ASSIGNOR TO THE INTERNATIONAL NICKEL COMPANY, OF NEW YORK, N. Y., A CORPORATION OF NEW JERSEY.

METHOD OF SEPARATING NICKEL AND COPPER FROM COPPER-NICKEL MATTES OR MATERIALS.

1,351,877.  Specification of Letters Patent.  Patented Sept. 7, 1920.

No Drawing.  Application filed February 5, 1919. Serial No. 275,239.

*To all whom it may concern:*

Be it known that I, ROBERT C. STANLEY, residing at New Brighton, in the county of Richmond and State of New York, have invented a new and useful Improvement in Methods of Separating Nickel and Copper from Copper-Nickel Mattes or Materials, of which the following is a full, clear, and exact description.

My invention relates to the separating of copper and nickel and the producing of commercial copper and commercial nickel from copper-nickel mattes or materials.

In describing my process in its preferred form, I will consider it as starting with a nickel-copper matte obtained in any well known way from ores containing nickel and copper. These mattes, which are usually Bessemer mattes, contain varying proportions of copper and nickel, and the separation of their contained metals, as commercial nickel and copper, has been a long expensive process involving a large number of steps.

The object of my invention is to cheapen this separation and reduce the time necessary therein, as well as to improve the purity of the commercial nickel obtained. Another object of the invention is to increase the percentage of precious metals recovered, these precious metals occurring in small proportions in the copper-nickel ores and mattes produced therefrom.

In carrying out my process in its preferred form, I smelt the copper-nickel matte in a cupola furnace with an alkali sulfid, or a sulfid of an alkali metal, or a material which will produce an alkali sulfid. In practice, I prefer to use niter cake as a relatively cheap material, this being a crude bisulfate of soda.

In order to commercially blow copper matte into blister copper, the matte must be of a certain richness in copper. To obtain this necessary richness in the sulfid copper separated from this first smelting operation, I preferably enrich the charge of this smelting operation by adding to it copper-bearing material. For this purpose, I preferably add the copper tops from the second smelting operation and separation hereinafter described, and also the "reverts" from the copper converters, and preferably other reverts, though the material may be enriched in this furnace by any desirable additions.

The smelting furnace in which this operation is carried out is preferably provided with a forehearth for separating the slag from the molten sulfids. The molten sulfids run continuously from the forehearth into transfer ladles. The slag may be taken to a heating furnace, where its temperature is raised sufficiently to make it more liquid, so that the beads or shots of metal may settle out and be recovered.

The molten sulfids from the forehearth are taken to a separating furnace, such for example, as a reverberatory furnace, in which the sulfid is kept in a molten condition by heat supplied from the fuel of the furnace. Two or more of these separating furnaces are preferably employed for a group of matte-smelting cupolas, so that each separating furnace may be operated on the fill-and-empty method. That is, one separating furnace is supplied with its charge of molten sulfid from the smelting cupolas, and this charge is allowed to settle, for example, during one shift of eight hours. While the separation of the metals is taking place in this furnace, another separating furnace is being charged with the molten sulfid for the same purpose.

In practice, I prefer to employ, in this hot-separating after the first smelting of the matte or material, about three separating furnaces to receive the molten sulfid from about five cupola furnaces, these separating furnaces being used in succession on the fill-and-empty method. These separating furnaces may be of any desirable type, provided sufficient heat is supplied to keep the sulfid in molten condition and allow the molten settling and separating thereof.

I also find that if these materials are held in the separating furnaces for say twenty-four hours to forty-eight hours, the sulfid of sodium will become oxidized and rise to the surface as sulfate of sodium, and may be removed and utilized in the smelting cupolas. In practice, I prefer to use this recovered soda in the second smelting operation later described.

During this period of settling and separating nickel containing some copper together with the precious metals of the platinum group will settle to the bottom, so that there will be two layers of sulfid in the furnace. The upper or copper layer consists of an impure double sulfid of sodium and copper and sodium and iron; while the lower layer consists of impure nickel sulfid containing some copper and iron and the precious metals. These layers are tapped out separately and I thus obtain a first rough separation of nickel from copper.

Considering now the upper layer of molten sulfid tapped from the separating furnace, this molten copper sulfid is taken directly to a converter or converters and blown at one operation into blister copper. Commercial blister copper is thus obtained at one operation after the molten separation, in my preferred form of operation. The impure nickel sulfid which is separately tapped out of the separating furnace is allowed to solidify in a receiving vessel. In this operation, the flux consisting of the sulfate of soda may be recovered to a considerable extent from the separating furnace, and this may be recovered and used; whereas in the old method, a large amount of soda was taken into the cold copper tops and lost in the copper smelter.

Instead of these steps, however, I may tap the molten material from the matte-smelting furnace above described into a large pot, where it is allowed to solidify. The solidified top thus formed will be mixed impure sulfids of copper and sodium and iron, while the nickel bottom will be an impure nickel sulfid containing copper, some iron and the precious metals of the platinum group. In this case, the copper sulfid tops are taken to a cupola and resmelted, the molten material then being conveyed to a reverberatory furnace from which it is taken to a converter and blown into blister copper. I prefer, however, the first method above named of molten separation in a group of separating furnaces, using the fill-and-empty method, as this effects a considerable saving in fuel, time and labor.

In either case, considering now the solidified nickel bottom, these bottoms are charged into a second smelting cupola, where they are again smelted with an alkali sulfid or the sulfid of an alkali metal or a material which will produce an alkali sulfid. In this case, again, I prefer to use niter cake. The resulting molten sulfids are tapped into a vessel, where they are allowed to solidify, thus again separating the impure copper sulfid from the impure nickel sulfid, producing a copper top and a nickel bottom. The smelting in this second cupola is preferably carried to such a point that the nickel bottom produced will contain about two to three per cent. or even more of copper.

In either case, that is, whether the method of hot or cold separation is employed after the first smelting furnace operation, the copper tops obtained after the second resmelting operation are preferably taken back and charged into the first smelting operation. These copper tops serve the important function of making the sulfid from the first smelting operation so rich in copper that after the molten smelting operation, it may be blown direct into blister copper. They also serve to supply alkali sulfid for the first smelting operation, and in many cases will furnish a sufficient amount of this without fresh additions thereof in the first smelting. Copper reverts may also be added to enrich the resulting sulfids in copper.

The nickel bottoms from the second smelting operation containing preferably about two to three per cent. or more of copper are then crushed and leached in a well known manner to take out the soda and some of the iron, this leaching preferably being carried out by washing with hot water to remove the soda, and then with dilute sulfuric acid to remove the iron.

The crushed and purified sulfid is then treated to convert the nickel sulfid into nickel oxid, preferably by roasting in any desirable type of roasting furnace. This operation is preferably simply one of desulfurizing the material by roasting, no chlorination being necessary. For this operation I am able to use powdered coal as the fuel instead of oil or other low sulfur fuel previously employed; owing to the electrolytic purifying of the impure nickel.

The next step is to reduce the impure nickel oxid thus obtained to a metallic state, and I preferably carry this out in any well known type of reducing furnace. For example, this furnace may be of the well known rotary inclined-cylinder type, the oxid being fed in at the upper end, subjected to a reducing heat and passing out the lower end in a continuous manner.

The impure metallic nickel thus obtained is melted in any desirable type of furnace, such as an open-hearth furnace, and is cast into anodes. For this operation I am able to use powdered coal as the fuel instead of oil or other low sulfur fuel previously employed; owing to the electrolytic purifying of the impure nickel.

These impure nickel anodes containing preferably about two or three per cent. or more of copper and containing the precious metals of the platinum group are then purified by an electrolytic process. In this process, the impure nickel is used as an anode, from which the nickel is plated upon the cathode, which preferably consists of a sheet of pure nickel, the precious metals entering the slimes produced in the electrolytic cells. The liquor of the cell is preferably continuously circulated through a cementing tank or tanks for removing the copper, the purified solution passing back to the cell. Iron may be removed from the solution, if desired, by any well known method. This electrolytic purifying may be carried out by any desirable type of purifying electrolytic cell or method. By this electrolytic refining step, I obtain commercial nickel.

The precious metals in the nickel anodes are recovered in the slimes from the electrolytic cells, and the electrolytic solution in these cells is preferably nickel sulfate with the ordinary additions commonly employed, such as weak acids, if desired.

The copper revert produced from the cementing in the cementation tanks is preferably charged into the copper converter in which blister copper is blown, though it may be charged back into the first smelting operation above described.

In my process, all of the reverts, such as those recovered from the copper converters, floor sweepings, flue dust, etc., will preferably be fed in the first matte-smelting furnace, and as the slag is recovered from this furnace, it will not interfere in the succeeding operations, either in the nickel treatment or in the copper treatment.

The advantages of my invention will be apparent to those skilled in the art, since a cheap and rapid method of obtaining commercially pure nickel and commercially pure copper from nickel-copper mattes or nickel-copper materials is provided. Furthermore, the precious metals or a large proportion thereof are recovered. These advantages result from my peculiar combination of hot or furnace methods with electrolytic refining methods, whereby a large number of steps now employed are done away with and the process made simpler and cheaper. Moreover, nickel obtained is of a high purity.

Additions to, subtractions from, or changes in the steps may be made in my process within the scope of my broader claims. For example, after crushing and leaching, as above described, to remove the soda, I may employ a chloridizing roast of the leached material to render soluble some of the contained copper, and then re-leach the roasted material to remove this soluble copper. From this releaching operation, the material still containing a material amount of copper would then pass on to the desulfurizing calcination above described. In other words, this would mean the addition of a chloridizing roast and a second leaching step between the leaching and calcining described in my preferred form.

Succeeding the solidifying and separation of the copper and nickel into tops and bottoms after the second smelting operation, I may re-smelt the cold nickel bottoms by a third smelting operation. From this third smelting operation, the material would be tapped into vessels in which new tops and bottoms would be formed, thus further reducing the copper in the final nickel bottoms. These modifications would, however, add to the cost of the process as carried out in my preferred form, and I consider them unnecessary since the electrolytic refining operation may be carried out with a copper content in the nickel anodes of at least two or three per cent. and even higher.

The number of smeltings for separation of the impure copper and impure nickel may be less or more than those specified in the preferred form described and the converting of the nickel salts into metallic nickel preliminary to electrolytic treatment may be carried out in other ways. Within the scope of some of my claims, the electrolytic separation need not be used, as I claim a number of subcombinations of steps herein. By the words, "a material proportion of copper" in the claims, I mean that the impure nickel carries a proportion of copper higher than that carried by commercial nickel; the same meaning applying to the words "a material proportion of copper material" in the claims.

I claim:

1. In the separation of nickel and copper from mattes or materials containing them, the steps of partially separating the copper material from the nickel material by furnace treatment, thereby producing a nickel material containing a material proportion of copper material, and then recovering metallic nickel therefrom by steps including electrolytic treatment.

2. In the separation of nickel and copper from mattes or materials containing them, the steps of partially separating the copper material from the nickel material by furnace treatment, converting the nickel material into impure metallic nickel containing a material proportion of copper, and then recovering metallic nickel therefrom.

3. In the separation of nickel and copper from mattes or materials containing them, the steps of partially separating the copper material from the nickel material by furnace treatment, converting the nickel material into impure metallic nickel containing a material proportion of copper, and then recovering metallic nickel therefrom by electrolytic treatment.

4. In the separation of nickel and copper from mattes or materials containing them, the steps of partially separating copper sulfid from nickel sulfid by furnace treatment, reducing the impure nickel sulfid to impure metallic nickel containing a material proportion of copper, and then recoving metallic nickel therefrom.

5. In the separation of nickel and copper from mattes or materials containing them, the steps of partially separating copper sulfid from nickel sulfid by furnace treatment, reducing the impure nickel sulfid to impure metallic nickel containing a material proportion of copper, and then recoving metallic nickel therefrom by electrolytic treatment.

6. In the separation of nickel and copper from mattes or materials containing them, the steps of partially separating the copper material from the nickel material by furnace treatment, thereby producing a nickel material containing a material proportion of copper material, calcining the same to produce impure nickel oxid, reducing the impure nickel oxid to impure metallic nickel containing a material proportion of copper, and then recovering metallic nickel therefrom.

7. In the separation of nickel and copper from mattes or materials containing them, the steps of partially separating the copper material from the nickel material by furnace treatment, thereby producing a nickel material containing a material proportion of copper material, leaching the impure nickel material, calcining the same to produce impure nickel oxid, reducing the impure nickel oxid to impure metallic nickel containing a material proportion of copper, and then recovering metallic nickel therefrom.

8. In the process of separating nickel and copper from mattes or materials containing them, the steps of smelting the copper-nickel matte or material, separating the impure nickel from the impure copper by gravity, resmelting the impure nickel material, again separating the impure nickel from the impure copper by gravity, thereby producing impure nickel material, and then reducing the impure nickel material to metallic nickel containing a material percentage of copper and recovering the nickel by electrolytic treatment.

9. In the process of separating nickel and copper from mattes or materials containing them, the steps of smelting the copper-nickel matte or material, separating the impure nickel material from the impure copper material by gravity, resmelting and again separating the impure nickel material, calcining the same to convert the impure nickel material into impure nickel oxid, then reducing the impure nickel oxid to metallic nickel containing a material proportion of copper, and recovering the nickel by electrolytic treatment.

10. In the process of separating nickel and copper from mattes or materials containing them, the steps of smelting the copper-nickel matte or material, separating the impure nickel material from the impure copper material by gravity, resmelting and again separating the impure nickel material, leaching the impure nickel material to remove the flux, calcining the same to convert it into an impure oxid, then reducing the impure nickel oxid to metallic nickel containing a material proportion of copper and electrolytically recovering the nickel therefrom.

11. In the process of separating nickel and copper from mattes or materials containing them, the steps of partially separating the nickel material and the copper material by furnace treatment, forming thereby a copper-nickel matte sufficiently high in copper for commercial bessemerizing into blister copper, and bessemerizing the same into blister copper.

12. In the separation of nickel and copper from mattes or materials containing them, the steps of smelting the copper-nickel matte or material, separating the impure nickel matte from the impure copper matte by gravity, bessemerizing the impure copper matte into blister copper, resmelting the impure nickel matte, and again separating the impure copper matte from the impure nickel matte.

13. In the process of separating nickel and copper from mattes or materials containing them, the steps of partially separating the nickel material and the copper material by furnace treatment, forming thereby a copper-nickel matte sufficiently high in copper for commercial bessemerizing into blister copper and also an impure nickel matte containing a material proportion of copper, and recovering nickel from the impure nickel matte.

14. In the process of separating nickel and copper from mattes or materials containing them, the steps of partially separating the nickel material and the copper material by furnace treatment, forming thereby a copper-nickel matte sufficiently high in copper for commercial bessemerizing into blister copper and also an impure nickel matte containing a material proportion of copper, bessemerizing the copper-nickel matte into blister copper, and recovering nickel from the impure nickel matte.

15. In the process of separating nickel and copper from mattes or materials containing them, the steps of smelting copper-nickel matte or material, removing the same from the smelting furnace and charging it into a separating furnace, allowing the impure copper material and impure nickel material to separate while molten, tapping them out separately, allowing the impure nickel material to solidify, and then recovering nickel therefrom.

16. In the process of separating nickel and copper from mattes or materials containing them, the steps of smelting copper-nickel matte or material, removing the same from the smelting furnace and charging it into a separating furnace, allowing the impure copper material and impure nickel material to separate while molten, tapping them out separately, allowing the impure nickel material to solidify, and then recovering nickel therefrom by steps including electrolytic treatment.

17. In the process of separating nickel and copper from mattes or materials containing them, the steps of smelting the copper-nickel matte or material, tapping the same from the smelting furnace, charging it into a separating furnace, allowing the impure copper material and impure nickel material to separate while molten, tapping them out separately, resmelting the impure nickel material, tapping it out of the furnace and forming cold copper tops and nickel bottoms, converting the impure nickel bottoms into the metallic state, and electrolytically recovering nickel therefrom.

18. In the process of separating nickel and copper from mattes or materials containing them, the steps of smelting the copper-nickel material, tapping the material out of the furnace, charging it into a separating furnace, allowing the material to settle and separate therein into impure copper material and impure nickel material, tapping them out separately, allowing the impure nickel material to solidify, resmelting the same, tapping the molten material out of the second smelting furnace into a vessel and allowing it to solidify to form impure copper tops and impure nickel bottoms, crushing and leaching the impure nickel bottoms to remove the flux, calcining to convert the impure nickel bottoms into impure nickel oxid, reducing the impure nickel oxid to the metallic state, forming into anodes, and electrolytically purifying the same.

19. In the process of separating nickel and copper from mattes or materials containing them, the steps of smelting nickel-copper matte or material, separating the impure nickel sulfid and the impure copper sulfid, recovering metallic copper from the impure copper sulfid, converting the impure nickel sulfid, containing a material proportion of copper into impure metallic nickel, and electrolytically recovering the nickel.

20. In the process of separating nickel and copper from mattes or materials containing them, the steps of smelting the nickel-copper matte or material, tapping the same out of the smelting furnace into a separating furnace, allowing the impure molten nickel material to settle and separate from the impure molten copper material, tapping out the impure molten copper material separately and blowing it while remaining molten into blister copper, allowing the impure nickel material to solidify, and recovering nickel therefrom.

21. In the process of separating nickel and copper from mattes or materials containing them, the steps of smelting the nickel-copper matte or material, tapping the same out of the smelting furnace into a separating furnace, allowing the impure molten nickel material to settle and separate from the impure molten copper material, tapping out the impure molten copper material separately and blowing it while remaining molten into blister copper, allowing the impure nickel material to solidify and recovering nickel therefrom by steps including electrolytic treatment.

22. In the process of separating nickel and copper from mattes or materials containing them, the steps of smelting the nickel-copper matte or material, enriching the furnace charge by charging in a copper material, tapping out the smelted material, separating the impure copper material from the impure nickel material, blowing the impure copper material directly into blister copper, allowing the impure nickel material to solidify, and recovering nickel therefrom.

23. In the process of separating nickel and copper from mattes or materials containing them, the steps of smelting the nickel-copper matte or material, enriching the furnace charge by charging in a copper material, tapping out the smelted material, separating the impure copper material from the impure nickel material, blowing the impure copper material directly into blister copper, allowing the impure nickel material to solidify, and recovering nickel therefrom by steps including electrolytic treatment.

24. In the process of separating nickel and copper from mattes or materials containing them, the steps of smelting the copper-nickel material, tapping out the material and separating the impure copper material from the impure nickel material, resmelting the impure nickel material, forming copper tops and nickel bottoms therefrom, enriching the first smelting charge by the copper tops from the second separation, converting the first separated impure copper material directly into blister copper, and recovering nickel from the impure nickel bottoms.

25. In the process of separating nickel and copper from mattes or materials containing them, the steps of smelting the copper-nickel material, tapping out the material and separating the impure copper material from the impure nickel material, resmelting the impure nickel material, forming copper tops and nickel bottoms therefrom, enriching the first smelting charge by the copper tops from the second separation, converting the first separated impure copper material directly into blister copper, and recovering nickel from the impure nickel bottoms by steps including electrolytic treatment.

26. In the process of separating nickel and copper from mattes or materials containing them, the steps of smelting the copper-nickel matte or material, tapping the same into a separating furnace, allowing the impure molten copper material to separate from the impure molten nickel material, withdrawing them separately, blowing the molten impure copper material directly into blister copper, allowing the impure nickel material to solidify, resmelting the impure nickel material, forming copper tops and nickel bottoms from the second smelting of the nickel material, enriching the first smelting operation with the copper tops from the second separation, converting the impure nickel bottoms into impure metallic nickel, containing a material proportion of copper, and subjecting the same to electrolytic refining.

27. In the process of separating nickel and copper from mattes or materials containing them, the steps of smelting nickel-copper matte or material, withdrawing the matte into a separating furnace, keeping it molten therein and allowing the impure nickel material and the impure copper material to separate, tapping them out separately, and recovering metallic copper from the molten copper material.

28. In the process of separating nickel and copper from mattes or materials containing them, the steps of smelting the nickel-copper matte or material, withdrawing the same into a separating furnace, supplying heat to keep the same molten and allowing the impure molten nickel material to separate from the impure molten copper material, tapping them out separately, blowing the impure copper material into blister copper, allowing the impure nickel material to solidify, and recovering nickel therefrom.

29. In the process of separating nickel and copper from mattes or materials containing them, the steps of smelting the nickel-copper matte or material, withdrawing the same into a separating furnace, supplying heat to keep the same molten and allowing the impure molten nickel material to separate from the impure molten copper material, tapping them out separately, recovering metallic copper from the impure copper material, allowing the impure nickel material to solidify, and recovering nickel therefrom by steps including electrolytic treatment.

30. In the process of separating nickel and copper from mattes or materials containing them, the steps of smelting nickel-copper matte or material, withdrawing the matte into a separating furnace, keeping it molten and allowing the impure nickel material and the impure copper material to separate therein, tapping them out separately, charging the molten copper material into a converter, blowing it therein, allowing the nickel material to solidify, resmelting the said nickel material, tapping it out of the second smelting furnace, and allowing it to settle and separate to form an impure copper top and an impure nickel bottom.

31. In the process of separating nickel and copper from mattes or materials containing them, the steps of smelting the nickel-copper matte or material, enriching the furnace charge by adding copper material, tapping out the smelted material, separating the impure copper material from the impure nickel material, and blowing the impure copper material thus obtained into blister copper.

32. In the process of separating nickel and copper from mattes or materials containing them, the steps of smelting the nickel-copper matte or material, enriching the furnace charge by adding copper material, tapping out the smelted material, transferring it into a separating furnace, tapping out the molten impure copper material therefrom, separately from the molten impure nickel material, and blowing the impure copper material thus obtained into blister copper.

33. In the separation of nickel and copper from mattes or materials containing them, the steps of partially separating the copper material from the nickel material by furnace treatment, then subjecting the impure nickel material containing some copper to recovery steps including an electrolytic process, and recovering precious metals from the slimes of said electrolytic process.

34. In the separation of nickel and copper from mattes or materials containing them, the steps of smelting the nickel-copper matte or material, enriching the furnace charge by charging in copper material from later operations to a sufficient extent so that on separation from this furnace the copper matte will be sufficiently rich for bessemerizing, withdrawing the smelted charge, separating the impure copper matte from the impure nickel matte, and blowing the impure copper matte directly into blister copper.

35. In the separation of nickel and copper from mattes or materials containing them, the steps of subjecting the copper-nickel matte or material to two successive smeltings and separations, producing in the second operation a nickel bottom having one per cent. or over of copper, converting this impure nickel bottom into metallic nickel containing a material proportion of copper, and electrolytically recovering the nickel therefrom.

36. In the separation of nickel and copper from mattes or materials containing them, the steps of partially separating the copper material from the nickel material by furnace treatment, reducing the separated impure nickel material, by steps including reduction by furnace treatment, to impure metallic nickel containing a material proportion of copper, and recovering the nickel by electrolytic treatment.

37. In the separation of nickel and copper from mattes or materials containing them, the steps of partially separating the copper material from the nickel material by furnace treatment, converting the nickel material into impure metallic nickel containing a material proportion of copper, by steps including a furnace treatment with fuels containing high percentages of sulfur, and then recovering metallic nickel therefrom.

38. In the separation of nickel and copper from mattes or materials containing them, the steps of partially separating the copper material from the nickel material by furnace treatment, converting the nickel material into impure metallic nickel containing a material proportion of copper, by steps including a furnace treatment with fuels containing high precentages of sulfur, and then recovering metallic nickel therefrom by electrolytic treatment.

In testimony whereof, I have hereunto set my hand.

ROBERT C. STANLEY.